United States Patent Office 3,597,322
Patented Aug. 3, 1971

3,597,322
SUBSTRATE COMPOSITION FOR AMYLASE ASSAY
Arthur L. Babson, Morristown, N.J., assignor to Warner-Lambert Pharmaceutical Company, Morris Plains, N.J.
No Drawing. Continuation-in-part of application Ser. No. 521,814, Jan. 20, 1966. This application Oct. 28, 1968, Ser. No. 771,354
Int. Cl. G01n 31/14
U.S. Cl. 195—103.5
9 Claims

ABSTRACT OF THE DISCLOSURE

A soluble substrate for use in assaying amylase activity in such media as body fluids, plant extracts, and the like, is prepared by coupling in an aqueous alkaline solution a reactive dye with a starch or starch fraction, such as amylose or amylopectin and subjecting the product obtained to a gel filtration or dialysis treatment to remove all unreacted dye. A solution of the dyed substrate obtained is then buffered to a pH of from about 6.5 to about 7.8 and chloride ion for activation of the amylase is added. Alternately, the substrate may be preserved by lyophilization and reconstituted with water at the time the assay is conducted. The assay is conducted by incubating an aqueous solution of the buffered chloride ion containing soluble substrate with a relatively small fluid sample under controlled time and temperature conditions; precipitating out the undigested dye substrate and any protein matter present in the fluid sample by the addition of alcohol or a solution of tannic acid in alcohol at a controlled pH and temperature; and measuring the optical density of the remaining clear supernatant liquid for the determination of amylase activity.

CROSS REFERENCE TO RELATED APPLICATION

This appplication is a continuation-in-part of my pending U.S. patent application Ser. No. 521,814, filed Jan. 20, 1966 and now abandoned.

BACKGROUND OF THE INVENTION

Starch, a polysaccharide, whose empirical formula is $(C_6H_{10}O_5)n$ is a polymeric material comprising essentially an amylose fraction of the formula:

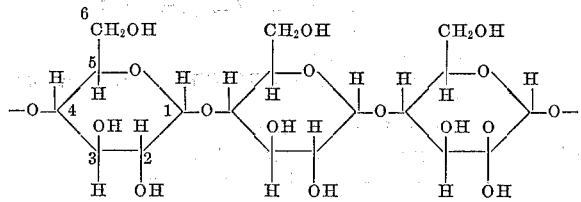

and an amylopectin fraction of the formula:

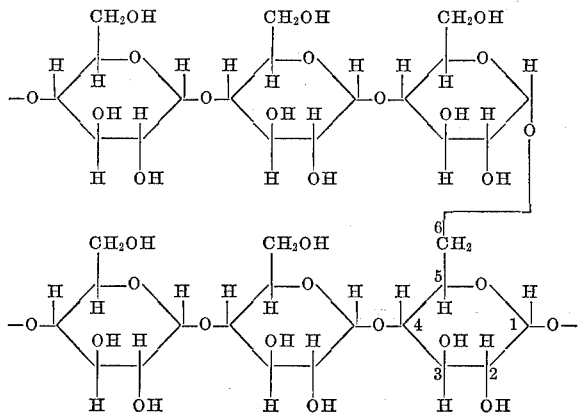

The amylases are enzymes which catalyze the hydrolysis of starch. The amylases are of two types, $\alpha$-amylase which can hydrolyze both the $\alpha$-1,4 and $\alpha$-1,6 linkages of amylose and amylopectin, respectively, and can therefore hydrolyze starch completely and $\beta$-amylase which can hydrolyze only the $\alpha$-1,4 linkage of the amylose thus leaving the $\alpha$-1,6 linkage of amylopectin unchanged. The action of $\alpha$-amylase is to hydrolyze both the amylose and amylopectin randomly which produces progressively smaller polysaccharide fragments until nothing remains but maltose and perhaps some glucose. $\alpha$-Amylase is activated by chloride ions and has optimum activity at a pH of about 7.

The amylases of animal origin are of the $\alpha$-amylase type. Their presence has been demonstrated in many tissues, but they are primarily produced by the pancreas and salivary glands. The function of the amylase present in the secretions of these glandular tissues is to aid in the digestion of starch by hydrolyzing or splitting the starch into smaller molecules which can then be absorbed and assimilated.

While for over 100 years amylase has been known to be present in the blood stream, the exact body source of this enzyme in normal serum has not been established. The source is apparently not in the pancreas and salivary glands as removal of these glands has a negligible effect on normal serum amylase levels. Serum amylase levels have been observed to be elevated in a number of pathological conditions, but the most spectacular rise in serum amylase levels occurs in acute pancreatitis where sudden increases to 30 to 40 times the normal level are not uncommon. In chronic pancreatitis the increases are more moderate and a substantial number of patients may actually have normal levels. The mechanism underlying this rise in serum amylase levels in these conditions appears to be obstruction of the outflow of secretion coupled with disruption of the acinar cells. The moderate elevations in serum amylase seen in perforated peptic ulcer and intestinal obstruction are probably caused by leakage of the enzyme from the intestinal tract into the peritoneal cavity and reabsorption from this cavity into the general circulation. Moderate elevations are also seen in mumps, renal insufficiency and cancer of the pancreas. Hepatobiliary disease is characterized by low levels of serum amylase.

The amylase activity of serum samples can be measured by observing the extent of the loss of certain properties of starch which amylase can effect as the starch is hydrolyzed (amyloclastic methods) or by the generation of reducing substances (saccharogenic methods). The amyloclastic methods have utilized the measurement of the decrease in viscosity (viscosimetric) or turbidity (turbidimetric) as the starch suspension is liquefied by the enzyme. More often the observed decrease in the blue color obtained by the reaction of the starch with iodine after an arbitrary incubation period is utilized as the measure of amyloclastic activity.

Many modifications of the basic iodometric procedure for the amyloclastic method introduced in 1908 by Wohlgemuth have appeared over the years. In some, the incubation time is fixed and the decrease in color is measured photometrically while in others the incubation is continued until the blue color is no longer obtained. The constant incubation technique has the disadvantage that the optical density obtained does not bear a linear relationship to the amount of enzymatic hydrolysis. The reason for this is that the starch-iodine color reaction goes through a series of color changes from blue to violet to amber to red to colorless as the size of the starch molecule diminishes. The variable incubation technique requires the removal of several aliquots of the enzyme sample-starch incubation mixture at various times for testing with iodine. This is quite cumbersome when several samples must be tested. All of the amyloclastic methods must use suboptimum substrate concentrations since destruction of the substrate rather than formation of reaction products is the measure of enzyme activity. Amyloclastic activity can vary considerably depending upon the source of the starch. Serum proteins can interfere markedly with the starch-iodine color reaction to give erroneous enzyme measurements (Clin. Chem. Acta 8: 918, 1963). Furthermore, as has been observed in Clin. Chem. Acta 9: 515, 1964, merely heating the saline-diluted, serum sample under study abolishes the apparent saccharogenic activity and elevates the apparent amyloclastic activity of the sample.

The original saccharogenic method of Somogyi (J. Biol. Chem. 25: 399) introduced in 1938 is still widely used, although it has subsequently been improved by Somogyi and by Henry and Chiamori. The latter method has been recommended. In this procedure, 1 ml. of serum or other suitable sample containing an unknown concentration of amylase is incubated at 40° C. for 30 minutes with 7 ml. of buffered substrate containing 75 mg. of starch. The reaction is terminated with tungstic acid, and reducing sugars are determined on the resulting filtrate. The amylase unit of activity, which is also known as the Somogyi unit, is defined as the amount of reducing substances in the incubated sample over a nonincubated control equivalent to 1 mg. of glucose. The normal range of amylase in blood is about 40–140 units/100 ml.

Even though these modified procedures for the saccharogenic method are much more accurate than the previously described amyloclastic methods, the saccharogenic method is basically very time consuming, complex, and requires that a large and variable blank of preformed reducing sugar be determined. Unhydrolyzed starch often creates turbidity and interferes with the determination of reducing sugars.

From the foregoing discussion, it is apparent that there is a genuine and serious need for a simple, rapid, and accurate method for assay ing amylase activity requiring a relatively small amount of sample.

SUMMARY OF THE INVENTION

This invention relates to a novel composition and its use as a substrate in a procedure for assaying amylase activity. The substrate is a dyed starch or a dyed starch fraction prepared so as to obtain a product that is soluble in aqueous fluids. The soluble substrate is prepared by coupling a reactive dye to a starch or a starch fraction in an alkaline solution. The reaction mixture is neutralized and the unreacted dye is removed by a gel filtration procedure or by dialysis treatment. The dyed starch solution is buffered to a pH of from about 6.5 to about 7.8 and chloride ion for activation of the amylase is added. The solution may be lyophilized for preservation. By an alternate procedure, the solution of the dyed starch may be lyophilized and the buffer and chloride ion added when the product is reconstituted just prior to the amylase determination. For the assay, a small amount of sample is combined with a buffered chloride ion containing solution of the soluble substrate and incubated under controlled time and temperature conditions, after which alcohol or a solution of tannic acid in alcohol is added at a controlled pH and temperature as the precipitating agent to insure the removal of all undigested substrate and protein matter present in the fluid sample under study. A 50% alcohol solution of 1% tannic acid buffered to a pH of from about 5.0 to about 5.5 and brought to a temperature of from about 20° C. to about 30° C., is preferred as the precipitating agent. After the precipitate is removed, e.g., by centrifugation, the clear supernatant fluid remaining contains alcohol soluble fragments resulting from the action of the amylase on the substrate. The amylase activity is a linear function of the optical density of this supernatant liquid.

DESCRIPTION OF THE INVENTION

The soluble substrate for use in the assay procedure of the present invention provides a simple, rapid, and accurate test method which uses a relatively small amount of sample. The assay combines the technical superiority of the prior art saccharogenic procedures with the speed and simplicity of the prior art amyloclastic method.

The reactive dyes useful in the practice of this invention are widely known in the cellulosic textile dyeing art, and as brought out in that art can be of various dyestuff classes, for example, azo, complex metal azo, anthraquinone, phthalocyanine, dioxazine or formazyl dyestuff, which, in particular, can also contain a sulfo group.

These dyes are sold, for example by Ciba Co., Inc. under their trade name "Cibacron," by Imperial Chemical Industries Limited under their trade name "Procion," by Farbwerke Hoechst A. G. under their trade name "Remazol," by Sandoz under their trade name "Drimarene," and by Geigy under their trade name "Reactone."

In general these reactive dyes have the following structural formulas:

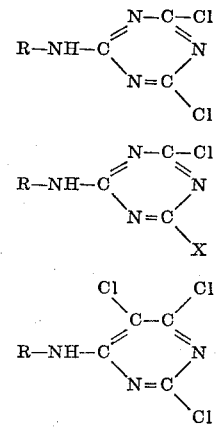

wherein R is a chromophor derived from the various classes of dyestuffs such as the azo, anthraquinone, formazyl or phthalocyanine structures mentioned and X is halogen or can be an inactive radical which may contain a solublilizing group. Examples of such reactive dyes are those that are described, for example, in U.S. Patent Nos. 2,820,785; 2,889,316; 2,891,941; 2,892,828; 2,979,498; 3054795; 3036058; 3149100; 3,127,232 and the like.

The reactive groups of these dyestuffs contain at least one substitutent which, under fixing conditions, splits off as an anion. The reactive group can consist, for example, of the radical of a cyclic carbimide halide which contains at least one mobile halogen atom bound to a carbon atom in the ring which is adjacent to a tertiary ring nitrogen atom. The reactive group can consist, in particular, of an azine ring of aromatic character which contains at least two tertiary ring nitrogen atoms and at least one mobile halogen atom bound to ring carbon adjacent to such nitrogen atoms such as, e.g. chlorine or bromine; examples of such reactive groups are mono-, di-, or tri-halogen diazinyl or mono- or di-halogen triazinyl groups.

The starch which is suitable for use in the practice of this invention can be obtained from potato, tapioca, corn, wheat, rice, sweet potato, waxy maize, or any other source which may be dyed in accordance with the process of this invention to yield the desired soluble dyed substrate. Solubility characteristics of the starch starting material may vary over a wide range but the dyed final product must be water-soluble for use on the assay of this invention. Amylose and amylopectin are commercially available as carefully standardized fractions, obtained from starch in the following manner: dilute starch pastes containing 2–3% of starch are autoclaved. The hot starch solution is saturated with an alcohol such as butanol or pentanol, in order to precipitate out essentially amylose, the straight chain fraction of starch, which gives an intense blue color with iodine. The main body of the starch present, not separated by this butanol treatment, is the amylopectin or branched chain fraction of starch which gives a red color with iodine. In the preferred embodiment of this invention, amylopectin is the fraction used.

While it is not necessary that the starch starting material will be soluble in water to any great extent, it has been found that it is critical that the dyed substrate used in the assay of this invention be soluble in water. The use of a dyed, water-soluble substrate provides a technically superior assay which is simple and fast, yet sufficiently sensitive to insure accuracy and reliability. For this reason, although insoluble or relatively insoluble starches can be reacted with a suitable reactive dye to yield a soluble product, the preferred embodiment of this invention utilizes amylopectin, the soluble starch fraction, as the starting material. The preferred amylopectin is sold commercially by National Starch and Chemical Corporation as Amioca 51–6002. Again, since this material is soluble it is possible to use a variety of the suitable reactive dyes and be assured that a soluble dyed substrate product will be obtained. However, in the preferred embodiment of this invention, the dye sold commercially by Geigy under the trade name Reactone Red 2B is used. This dye is reported in the literature (Ackermann and Dussy in Melliand's Textilber. Vol. 42, page 1167, 1961) to have the following structure;

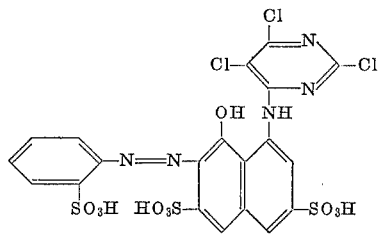

The soluble dyed substrate is obtained in accordance with the practice of this invention by coupling the starch starting material in an alkaline solution with a suitable reactive dye. The temperature and duration of the reaction, as well as the ratio of starch to dye and alkaline concentration are all dependent variables which may be changed to a considerable extent and still yield the desired soluble substrate of this invention. However, for ease of operation, it has been found that conducting the reaction at room temperature (from about 20° C. to about 30° C.) overnight (from about 16 hours to about 24 hours) using a starch to dye ratio of from about 2.5:1 to about 100:1, preferably about 4:1, and alkaline concentrations of from about 0.1 to about 1.5 N, is practical and therefore preferred. The alkali in the resulting mixture is then neutralized with an aqueous solution of an acid, for example, aqueous hydrochloric acid. Conventional procedures used in the textile field for the removal of unreacted dye involve the use of alcohol. However, these procedures have an adverse effect on the water solublity of the dyed substrate of this invention. It has now been found that unreacted dye can be completely removed from the dyed substrate of this invention by gel filtration or by dialysis. While many commercially available gel filtration systems are suitable, in the preferred embodiment of this invention Sephadex G–25 sold by Pharmacia Fine Chemicals Inc., Piscataway, N.J., is particularly preferred. In this system, the equilibrating liquid is preferably water.

Purification of the dyed soluble substrate can also be achieved by dialysis treatment, or more readily by electrodialysis.

The solution of the soluble dyed substrate obtained by the above procedure must be buffered to a pH of from about 6.5 to about 7.8 with a conventional buffering agent for use in the amylase assay. In the preferred embodiment of this invention, a system which buffers at a pH of about 7 and does not interfere with the enzymatic reaction is particularly recommended. In this regard, it has been found that 0.1 M anhydrous dibasic potassium phosphate and 0.1 M monobasic potassium phosphate are most preferred as the buffering system.

Since chloride ions must be present to activate the enzyme amylase, small quantities of an agent which will yield chloride ions are also needed for the amylase assay. For example, a sufficient quantity of a dilute aqueous solution of sodium chloride to provide a concentration of from about 0.005 molar to about 0.05 molar in the final assay media has been found to be effective.

The assay media as described above can be stored as such, preferably at refrigeration temperatures, or lyophilized (freeze-dried) for preservation, and reconstituted with water at the time the assay is conducted. Alternately, the dyed starch product may be lyophilized as it is prepared, and the buffering agent and chloride ion material may be added just prior to use in an assay. However, for ease of use, accuracy of preparation and product stability, lyophilization after all necessary reagents have been added is preferred.

In carrying out the assay for amylase activity according to the practice of this invention, from about 0.5 to about 2 ml. of a water solution containing about 1% of the dyed soluble substrate, buffered to a pH of from about 6.5 to about 7.8 and containing sufficient chloride ion for activation of the amylase, is incubated with a small amount (from about 0.1 to about 0.2 ml.) of fluid sample whose activity is to be determined. The incubation is conducted at conventional temperatures and for a specified period of time, which may vary to a considerable extent: the higher the temperature, the shorter the incubation time. It has been found that incubation for about 10 minutes at temperatures of about 37° C. provides an assay of extremely good sensitivity in the shortest length of time for the levels of amylase activity normally found in blood serum. One could conduct the incubation at a lower temperature for a longer period of time or for a shorter period of time if great sensitivity was not required. However, once the time and temperature for incubation is selected, it must be repeated with exactitude in all succeeding assays for which the same reference standards are to be used. At the end of the incubation period, all undigested dyed substrate and any protein matter present in the fluid sample being assayed must be removed in order to obtain accurate optical density measurements as an indication of amylase activity. A lower alcohol, preferably methanol or ethanol, may be used to precipitate out the undigested starch substrate, but a lower alcohol solution (preferably methanol or ethanol) of tannic acid is preferably used as the precipitating agent. The precipitating agent should be added to the assay media at a controlled temperature and pH in order to achieve successful separation of any undigested starch and protein from the enzyme hydrolysis products on which optical density measurements are to be made. All of the above aspects of the precipitating agent are interrelated and many possible variations will achieve the desired results. For instance, the concentration of alcohol will affect the operable pH range; the concentration of tannic acid the operable pH range; the concentration of tannic acid in the alcohol solution will affect the amount of buffer required; the temperature and the pH will affect the complete precipitation of undigested starch and protein material. It has been found, however, that the objectives of this invention are achieved by using, as the precipitating agent, alcohol (preferably absolute), or from about 0.5% to about 2% solution of tannic acid in about 50% alcohol. The alcoholic tannic acid solution is buffered to a pH of from about 5.0 to about 5.5, preferably from about 5.3 to about 5.4. The precipitating agent is brought to a temperature of from about 20° C. to about 30° C., preferably from about 23° C. to about 26° C. before addition to the assay media. In the most preferred embodiment, the precipitating agent used is an about 1% tannic acid solution in about 50% methanol, buffered to a pH of about 5.35, and brought to a temperature of about 25° C. The buffering agents which are suitable for use with the above precipitating agent include citrate, benzoate, acetate, and the like, of which the 0.1 M benzoate is preferred.

The precipitate formed by the addition of the precipitating agent is completely removed by centrifugation or by filtration. The separated residue is discarded and the clear supernatant fluid remaining contains the alcohol soluble, hydrolytic fragments resulting from the action of the amylase on the dyed starch substrate. The optical density of this supernatant fluid is then determined at the absorption maximum for the particular dye used. The optical density (absorbence) is a linear function of the concentration of amylase in the fluid samples being tested and when suitably calibrated, the amylase concentration may be read directly. A blank assay is run in which the precipitating agent is added before the enzyme sample. The optical denstiy of the blank is subtracted from the optical density of the test sample to eliminate the effect of assay reagents on the values obtained from the enzymatic hydrolysis products.

The exact chemical structure of the soluble dyed substrate of this invention is not known, but it is believed that similar to the manner in which the reactive dyes couple with alkali treated cellulose, the dyes also combine with the free hydroxyl groups of the starch, amylose, or amylopectin employed. See for example U.S. Pat. Nos. 1,886,480; 3,044,843; and 3,029,123. An empirical formula of $(C_6H_{10}O_5)n$-D has been assigned to these novel substrates, wherein $n$ is a large whole number, $(C_6H_{10}O_5)n$ represents a naturally occurring polymer such as starch, amylose, or amylopectin, and D is the residue of any reactive dye.

In order to illustrate the present invention the following examples are given.

EXAMPLE 1

Preparation of dyed amylopectin—gel filtration purification method 40 grams of amylopectin (Amioca Starch 51–6002) are dissolved in 1000 ml. of distilled water and stirred. 100 ml. of a 10% aqueous solution of Geigy Reactone Red 2B are added, followed by 100 ml. of 2.5 N NaOH solution, and batch is stirred until it becomes too viscous for stirring. The batch is covered and allowed to stand at room temperature (23° to 26° C.) for about 18 to 24 hours (overnight). Add 1 N hydrochloric acid (about 250 ml.), with stirring to neutralize the reaction mixture (pH of 7) then dilute with distilled water to a volume of 1900 ml. and mix well. This reaction mixture is passed through a Sephadex G–25 column having a minimum height of 15 cm. and a void volume of 1100 ml., to remove all unreacted dye. Water is used as the equilibrating liquid. Fractions of the purified dyed starch are collected until the unreacted dye starts to elute. The eluant of the column is monitored for the presence of the alcohol soluble dye. About 1400 ml. of useful substrate can be obtained. The solution thus obtained is then buffered to maintain a pH of about 7 by the addition of an 0.1 M phosphate buffer. A sufficient amount of NaCl is added to yield 0.005 M NaCl in the final solution. The final solution may be used in the assay as described in Example 3 below or it may be lyophilized.

EXAMPLE 2

Preparation of dyed amylopectin—dialysis purification method

The procedure of Example 1 is followed to obtain the reaction mixture containing the dyed substrate, diluted to a volume of 1900 ml. The reaction mixture is then transferred to dialysis casings, one-inch diameter, and dialyzed against cold, running tap water until all alcohol soluble dye is removed. Periodically, the dialysis casing is opened and the substrate is tested for the presence of alcohol soluble dye. In approximately one week, the unreacted dye is separated from the dyed substrate. The solution of substrate obtained is further treated as in Example 1.

EXAMPLE 3

0.2 ml. of a sample of blood serum is incubated with 1 ml. of the buffered soluble dyed substrate obtained in accordance with Example 1 or Example 2 for 10 minutes at 37° C. At the end of this incubation period, 5 ml. of a 1% tannic acid solution, in 50% methanol, buffered with 0.1 M benzoic and sodium benzoate buffer to a pH of 5.35, is brought to a temperature of 25° C. and added to the assay media is added. The resulting precipitate is removed by centrifugation. The optical density of the supernatant solution is then determined at a wavelength of 540 nm. A blank assay is run by adding the buffered alcoholic tannic acid precipitating agent before the enzyme source. The optical density of this blank is subtracted from the optical density of the unknown. As a reference standard, serum containing a known concentration of amylase is also subjected to the test. Since the amount of alcohol soluble, dyed hydrolytic fractions formed by the enzymatic hydrolysis of the substrate by the amylase present is proportional to the enzyme concentration, the amount of amylase present in the unknown sample can be readily calculated.

EXAMPLE 4

A soluble substrate is prepared from amylose and a reactive dye, in an analogous fashion to the procedure of Example 1 or 2. This product is used in the assay procedure of Example 3, and the results obtained are equally satisfactory.

EXAMPLE 5

A soluble substrate of dyed corn starch and a reactive dye is prepared according to the procedure of Example 1 or 2 and employed in the assay procedure of Example 3. The results obtained are equally satisfactory.

It is understood that the foregoing detailed description is given merely by way of illustration and that many variations may be made therein without departing from the spirit of my invention.

Having described my invention, what I desire to secure by Letters Patent is:

1. A composition for the determination of amylase concentration comprising an aqueous solution containing:
   (A) a water soluble dyed substrate of the formula:

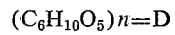
   $$(C_6H_{10}O_5)n = D$$

wherein $n$ is a large whole number, $(C_6H_{10}O_5)n$ is a polysaccharide selected from the group consisting of starch, amylose and amylopectin, and D is the residue of a reactive dyestuff, said substrate being prepared by incubating an alkaline solution of the polysaccharide with the reactive dye; neutralizing the reaction mixture; and removing all unreacted dye by gel filtration to obtain a purified, water-soluble dyed substrate containing only chemically bound reactive dye; and
   (B) a sufficient amount of chloride ion to provide a final concentration of from about 0.005 M to about 0.05 M;

said aqueous solution being buffered to maintain a pH of from about 6.5 to about 7.8.

2. A lyophilized composition of claim 1.
3. A composition as defined in claim 1, wherein the polysaccharide is amylopectin, and the reactive dye has the formula:

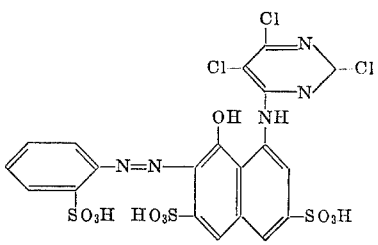

4. A composition according to claim 3, wherein the chloride ion is added as sodium chloride; and wherein the solution aqueous is buffered to a pH of about 7, with a combination of 0.1 M anhydrous dibasic potassium phosphate and 0.1 M monobasic potassium phosphate.

5. A lyophilized composition of claim 3.

6. A lyophilized composition of claim 4.

7. A method for determining the amylase concentration in a fluid sample which comprises:
(A) Incubating a mixture of said fluid sample and a water-soluble dyed substrate in the presence of a sufficient amount of chloride ion to provide a final concentration of from about 0.005 M to about 0.05 M and a buffer to impart a pH of from about 6.5 to about 7.8, for a predetermined period of time and at a controlled temperature, said water-soluble dyed substrate having the formula:

$$(C_6H_{10}O_5)n\text{-}D$$

wherein $n$ is a large whole number, $(C_6H_{10}O_5)n$ is a polyaccharide selected from the group consisting of starch, amylose and amylopectin, and D is the residue of a reactive dyestuff, said water-soluble dyed substrate being prepared by:
  (a) incubating an alkaline solution of the polysaccharide with the reatice dye;
  (b) neutralizing the incubated mixture; and
  (c) removing all unreacted dye by gel filtration to obtain a purified, water-soluble dyed substrate containing only chemically bound reactive dye;
(B). Adding to said incubated mixture (A) a precipitating agent which has been brought to a temperature of from about 20° C. to about 30° C., said precipitating agent being an alcoholic tannic acid solution containing from the 0.5% to about 2% tannic acid in about 50% alcohol buffered to a pH of from about 5.0 to about 5.5;
(C) Removing the precipitate thereby formed to obtain a clear supernatant fluid which contains the products resulting from any amylase activity; and then
(D) Measuring the optical density of the supernatant liquid.

8. A method according to claim 7, wherein the precipitating agent is a solution of about 50% methanol containing about 1% tannic acid, buffered to a pH of from about 5.3 to about 5.4 and brought to a temperature of from about 23° C. to about 26° C.

9. A method according to claim 7, wherein the precipitating agent is a solution of about 50% methanol containing about 1% tannic acid, buffered to a pH of about 5.35 with a 0.1 M. benzoic acid/sodium benzoate buffer, and brought to a temperature of about 25° C.

References Cited
UNITED STATES PATENTS 3,304,297  2/1967  Wegman et al. _____ 260—144

OTHER REFERENCES

Fernley, Biochem. J. vol. 87, pp. 90–95 (1963).
Huggins et al., Annals. of Surgery, vol. 128 pp. 668–678 (1948).

ALVIN E. TANENHOLTZ, Primary Examiner

U.S. Cl. X.R.

260—153, 233.3